C. P. S. Wardwell,
Box Opener.

N° 14,783. Patented Apr. 29, 1856.

Witnesses:
Benj. R. Eames
John Aldrich Jr.

Inventor:
Chas. P. S. Wardwell

UNITED STATES PATENT OFFICE.

CHARLES P. S. WARDWELL, OF LAKE VILLAGE, NEW HAMPSHIRE.

BOX-OPENER.

Specification of Letters Patent No. 14,783, dated April 29, 1856.

*To all whom it may concern:*

Be it known that I, CHAS. P. S. WARDWELL, of Lake Village, in the county of Belknap and State of New Hampshire, have invented a new and useful Improvement in Openers; and I do hereby declare that the following is a full and exact description thereof, reference being had to the accompanying drawings, making part of this specification, in which—

Figure 1:
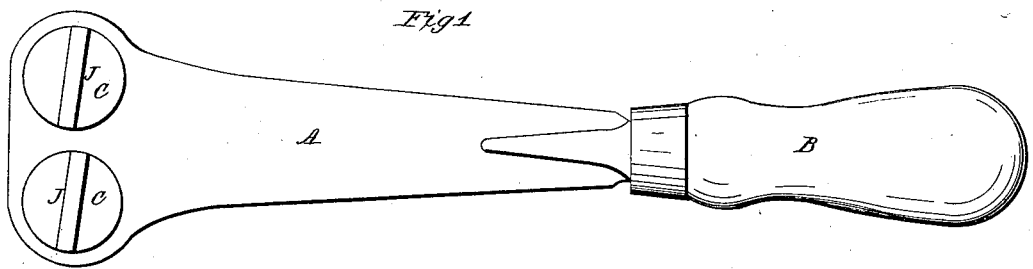
Figure 2:
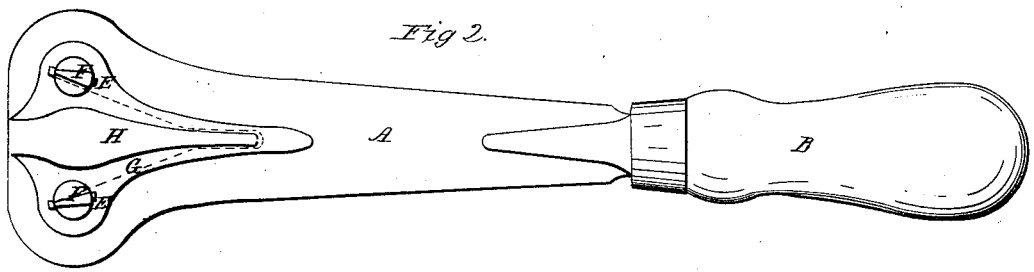
Figure 3:
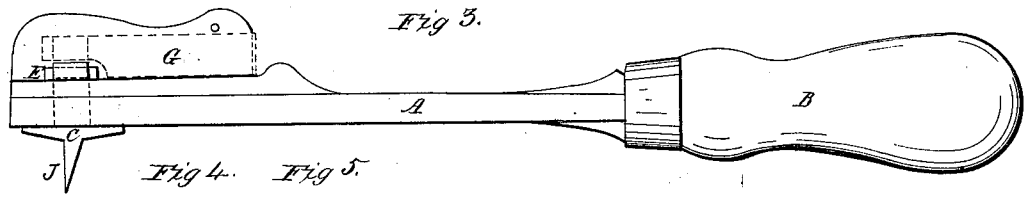
Figures 4, 5:
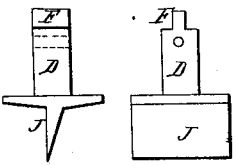

Figure 1 is a view of the front or face, and represents it as ready for use. Fig. 2, is a view of the back. Fig. 3, represents it as viewed edgewise. Fig. 4, is a view of one of the dogs, with the end of the lip toward you. Fig. 5, is a view of one of the dogs, with the face of the lip toward you.

To enable others skilled in the art to make and use my invention, I will proceed to describe its construction and operation.

A, is the stock or body, made of any suitable material.

B is the handle attached in any suitable manner.

C, C, Fig. 1, are two movable, or rotary, dogs, these dogs are attached to the stock by a round shank D Figs. 4 and 5, by which they are allowed to turn freely; and are held in by a pin E, Fig. 3. The shanks of these dogs are flattened at their outer ends, as shown at F, Fig. 5.

G, Figs. 2 and 3, is a steel spring shown by the red lines. This spring passes around a projection H on the back of the stock. Its ends impinge on the flattened portion of the dog shanks, as shown at F, F, Fig. 2, and is for the purpose of retaining the lips J, J, Fig. 1, of the dogs on a line or parallel so as to be ready for use, also to bring them on to a line when partially turned. Each dog may be turned half around when they will again come on a line and permit the tool being used right or left handed.

J, Fig. 4, shows an end view of the lip of the dogs. These lips are of a wedge shape the outer edge being sharp enough to drive into a crack. The face side of the lip is parallel with axis of the dog. The back side forms an acute angle with the axis of the dog.

The operation of this tool is as follows: Hold the handle upward and drive the dogs into the crack, or joint, between the cover and body of the box to be opened, by striking on the projection H, Figs. 2 and 3, at its thickest part. Then move the handle B toward the dog, the lip of which is face down or toward the body of the box, and the box cover will be raised at that place, then repeat the operation till the cover can be removed without the tool. In the operation of this tool the handle is the lever, the lip that is face down is the fulcrum, and the lip, which is face up, the short arm of the lever.

The advantage of rotary dogs is in presenting a flat surface to the wood and maintaining it during the operation of opening a box, which lessens the liability of splitting the cover, and also bruising or disfiguring the wood; and under ordinary circumstances the operation of opening a box is easily performed and with much less injury to the cover than by the means usually employed.

The tool is cheap and substantial, and perfectly practical.

What I claim as my invention and desire to secure by Letters Patent is—

1. The employment of rotary dogs C, C, or their equivalents, substantially in the manner and for the purpose herein set forth.

2. I also claim the combined arrangement of the spring G, and flattened shanks F, F, of the dogs, whereby the wedge lip of the dogs are kept in the same line, or parallel with each other for convenience of insertion, without hindering the desired rotary motion of the dogs.

CHAS. P. S. WARDWELL.

Witnesses:
JOHN ALDRICH, Jr.,
BENJ. R. EAMES.